(12) United States Patent
Allinson et al.

(10) Patent No.: US 9,936,044 B2
(45) Date of Patent: Apr. 3, 2018

(54) INFERRING USER IDENTITY ACROSS MULTIPLE APPLICATIONS AND USER DEVICES

(71) Applicant: Yahoo! Inc., Sunnyvale, CA (US)

(72) Inventors: Ric Allinson, Sunnyvale, CA (US); Daryl Low, San Jose, CA (US); Atte Lahtiranta, Cupertino, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 470 days.

(21) Appl. No.: 14/574,906

(22) Filed: Dec. 18, 2014

(65) Prior Publication Data

US 2016/0182658 A1  Jun. 23, 2016

(51) Int. Cl.
*H04L 29/08* (2006.01)

(52) U.S. Cl.
CPC ........ *H04L 67/306* (2013.01); *H04L 67/1097* (2013.01)

(58) Field of Classification Search
CPC combination set(s) only.
See application file for complete search history.

(56) References Cited

U.S. PATENT DOCUMENTS

2007/0283011 A1* 12/2007 Rakowski ........... H04L 41/0803
                                                      709/225
2010/0333137 A1* 12/2010 Hamano ............. H04H 60/46
                                                      725/39
2011/0302630 A1* 12/2011 Nair .................... G06F 21/41
                                                      726/4
2012/0023157 A1*  1/2012 Roth .................... H04L 67/306
                                                      709/203
2014/0082151 A1*  3/2014 Chen ..................... H04L 67/14
                                                      709/219

FOREIGN PATENT DOCUMENTS

WO    WO 2015078281 A1 *  6/2015  ............... G06F 8/61

* cited by examiner

*Primary Examiner* — Chris Parry
*Assistant Examiner* — Caroline Jahnige
(74) *Attorney, Agent, or Firm* — Pillsbury Winthrop Shaw Pittman LLP

(57) ABSTRACT

The present teaching relates to creating and updating a user profile related to multiple devices, and synchronizing applications' sessions for the user on different devices. Upon execution of a first application on a first device, a first device ID associated with the first device and information about the first application are received. A user profile is created based on the first device ID and the information about the first application. Upon execution of a second application on a second device related to the first device, a second device ID associated with the second device and information about the second application are received. The user profile is updated based on the second device ID and the information about the second application. Further, the information about the first application is applied to the execution of the second application on the second device, or vice-versa.

17 Claims, 10 Drawing Sheets

INFERRING USER IDENTITY ACROSS MULTIPLE APPLICATIONS AND USER DEVICES

BACKGROUND

1. Technical Field

The present teaching relates to inferring whether a same user is accessing or using a set of applications on one device or across multiple devices, and creating a user profile based on such an inference.

2. Technical Background

In general, users are increasingly using multiple computing devices, e.g., that are based on different operating systems or belong to different computing ecosystems. However, if a user wants to use a same application or a same set of applications on different devices with a consistent (or synchronized) content, user interface and/or ad-related experience across those devices, the user may have to either log into the application(s) with their app-related account or configure the application(s) on each device individually with their content, user interface and/or ad-related preferences.

Generally, an entity that provides and manages the applications on user devices is not aware of or is not able to infer which devices and applications are associated with a certain same user, such that same or similar user preferences (e.g., for personalization, ad targeting, security, etc.) may be applied across different devices, without having the user to create or login into an app-related account.

SUMMARY

The teachings disclosed herein relate to methods, systems, and programming for creating and updating user profiles for users each of whom are associated with a plurality of devices, and for each user, synchronizing applications' sessions on different devices.

In one example, a method, implemented on a machine having at least one processor, storage, and a communication platform capable of connecting to a network to create and update a user profile related to a plurality of devices is disclosed. Responsive to an execution of a first application on a first device in a first session in which a user is logged on to a cloud network via the first device and a first device identifier is associated with the first device, a user profile specific to the user may be created and stored at the storage unit. In the user profile, the first device identifier and information related to the first application are recorded. A cloud-based identifier may be associated with the user's session with the cloud network, and the cloud-based identifier may also be recorded in the user profile.

Further, responsive to an execution of a second application on a second device in a second session in which the user is logged on to the cloud network via the second device, and a second device identifier is associated with the second device, a query to determine whether a target user profile including the first device identifier or the cloud-based identifier exists is received from the second device. The query to determine whether the target user profile exists is processed. Responsive to a determination that the target user profile exists, the second device identifier and information related to the second application are added in the target user profile. The first and second applications may be related, e.g., may belong to a same set of related applications. The first and second device identifiers may be received from the corresponding user devices, or may be generated by a device ID unit.

In a different example, a method, implemented on a machine having a processor, a storage unit, and a communication platform capable of making a connection to a network to synchronize applications sessions on different devices, is disclosed. The method may include receiving, from a first device via the communication platform, a first device ID associated with the first device of a user and information about a first application executed on the first device, and creating, by a profile creation and update unit, a user profile based on the first device ID and the information about the first application. The method may further include receiving, from a second device via the communication platform, a second device ID associated with the second device of the user and information about a second application executed on the second device; and updating, by the profile creation and update unit, the user profile based on the second device ID and the information about the second application. An app update unit may be used to apply the information about the first application to the execution of the second application on the second device, wherein the first and second applications are related.

In another example, a system to create and update a user profile related to a plurality of devices is disclosed, which includes a storage unit, a profile creation and update unit, and a query processing unit. The profile creation and update unit may be configured to, in being responsive to an execution of a first application on a first device in a first session in which a user is logged on to a cloud network via the first device, wherein a cloud-based identifier is associated with the user's session with the cloud network and a first device identifier is associated with the first device, create a user profile specific to the user, and store the user profile at the storage unit, and record, in the user profile, the first device identifier and information related to the first application, and optionally, the cloud-based identifier.

The query processing unit may be configured to, in being responsive to an execution of a second application on a second device in a second session in which the user is logged on to the cloud network via the second device, wherein a second device identifier is associated with the second device, receive, from the second device, a query to determine whether a target user profile including the first device identifier or the cloud-based identifier exists, and process the query to determine whether the target user profile exists. The profile creation and update unit may be configured to, in being responsive to a determination that the target user profile exists, add the second device identifier and information related to the second application in the target user profile.

Other concepts relate to software to implement the present teachings on inferring user identity across different applications and devices, and creating and updating a user profile based on such inference. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having data recorded thereon to create and update a user profile related to a plurality of devices, where the information, when read by the machine, causes the machine to perform a plurality of operations. Such operations may include, responsive to an execution of a first application on a first device in a first session in which a user is logged on to a cloud network via the first device and a first device identifier is associated with the first device, creating and storing a user profile specific to the user. In the user profile, the first device identifier and information related to the first application are recorded. A cloud-based identifier may be associated with the user's session with the cloud network, and the cloud-based identifier may also be recorded in the user profile.

The operations may further include, responsive to an execution of a second application on a second device in a second session in which the user is logged on to the cloud network via the second device, and a second device identifier is associated with the second device, receiving (from the second device) and processing a query to determine whether a target user profile including the first device identifier or the cloud-based identifier exists. Further, responsive to a determination that the target user profile exists, an operation of adding the second device identifier and information related to the second application in the target user profile may be performed. The first and second applications may be related, e.g., may belong to a same set of related applications. The first and second device identifiers may be received from the corresponding user devices, or may be generated by a device ID unit.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, and other implementations directed to inferring that a set of applications on a single device or multiple devices are related in that the applications are accessed (or used) by a same user (on the single device or multiple devices). The disclosed systems, methods, and other implementations may be realized as a specialized and networked system by utilizing one or more computing devices (e.g., mobile phone, personal computer, etc.), and (wired or wireless) network communications. The set of applications may include traditional software applications such as, but not limited to, word processing applications, web browsers, e-mail and other communication-related applications, etc., as well as standalone mobile applications (or "apps") such as, but not limited to, search engine app (e.g., Yahoo! search), e-mail app (e.g., Yahoo! Mail), news-related app, etc.

User devices may include, but not limited to, desktop computers, laptop computers, smartphones, tablet computers, wearable computing devices, etc. In some embodiments, applications and/or devices that are assessed or inferred to be associated with a same user may be considered to belong to a same "cluster," and information regarding the clustered applications and/or devices may be recorded and updated in a user profile for the user. The information in the user profile may provide knowledge about a complete set of applications and devices, as well as their respective configurations, user preferences and settings, that are associated with the user. Such knowledge may be used for personalization (of content, user interface elements, etc.), user tracking (for ad targeting, etc.), automatic login into certain application(s)/device(s), protection against fraud or unintended access, and/or other purposes.

Figure 1:
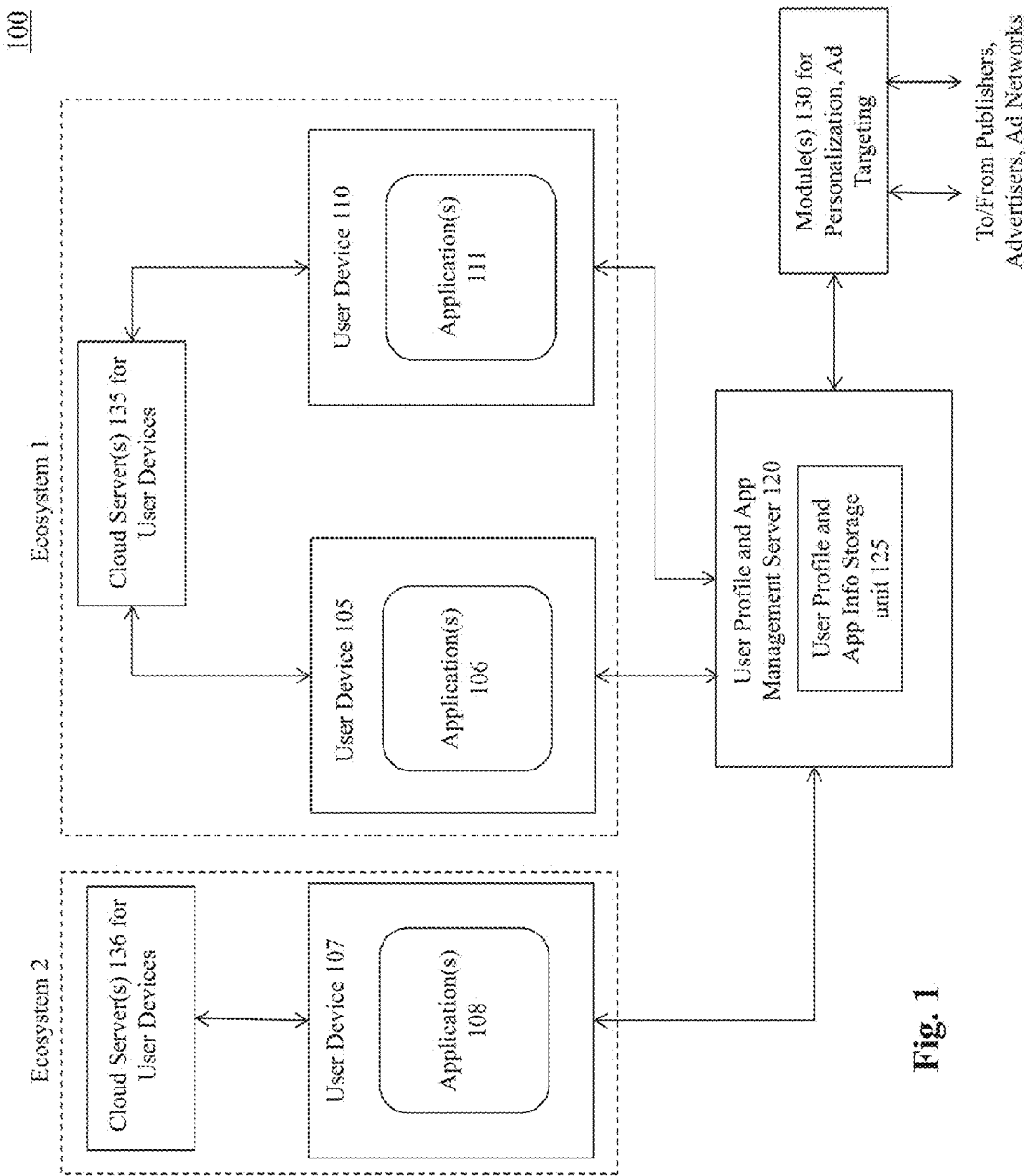
FIG. 1 illustrates an example of a system to create and update a user profile for a certain user associated with multiple applications and devices, in accordance with various embodiments of the present disclosure.

FIG. 1 illustrates a broad overview of a system 100 in which an embodiment of creating a user profile that includes information about related applications and devices for a user is implemented. As shown, system 100 includes server(s) and device(s) related to different computing ecosystems (e.g., ecosystem 1 and ecosystem 2), a user profile and app management server 120 and module(s) 130 related to features such as personalization, ad targeting, etc. Each of ecosystem 1 and ecosystem 2 may relate to a specific entity that provides cloud computing and storage services for user devices that are designed for and operate on a specific operating system. For example, ecosystem 1 may relate to Apple's iCloud network in which a user may be able to log into and access iCloud services via server(s) 135 using his/her unique iCloud login credentials (e.g., a username and password combination) at device 105 (e.g., iPhone) and device 110 (e.g., iPad or Mac desktop computer). Ecosystem 2 may relate to Google's cloud network in which a user may be able to log into and access Google's cloud services via server(s) 136 using his/her unique Google/Android cloud login credentials (e.g., a username and password combination) at device(s) 107 (e.g., an Android-based smartphone or tablet computer). Ecosystem 1 and ecosystem 2 may relate to any entity other than Apple and Google, e.g., Microsoft, Amazon, etc., but, in the context of this disclosure, both these ecosystems (or cloud networks) are different in terms of at least the operating system used by the devices and servers within the respective ecosystem/cloud network. Although only two computing ecosystems are shown, for convenience, there may be more or less number of ecosystems in system 100.

Devices 105, 107, 110 each may be a computing device, e.g., a personal computer, a tablet computer, a smartphone, a wearable computing device, and/or other computing devices, accessible/owned by a same user. As discussed above, devices 105, 110 may be configured to operate in accordance with configurations of ecosystem 1 (e.g., devices 105, 110 both may have a same or similar operating system compliant with ecosystem 1). Device(s) 107 may be configured to operate in accordance with configurations of ecosystem 2 (e.g., device(s) 107 may have a same or similar operating system compliant with ecosystem 2, different from the operating system of ecosystem 1). Devices 105, 107, 110 may be different, separate devices, or may be a single device that is communicatively associated at least with servers 135, 136, and user profile and app management server 120. Although only two devices are shown in ecosystem 1 and only one device is shown in ecosystem 2, such depictions are merely illustrative, there may be more or less number of devices in each of the ecosystems of system 100.

Devices 105, 107, 110 each may have installed thereon one or more applications (e.g., applications 106, 108, 111, respectively). The applications may include, such as, but not limited to, browsers, e-mail applications, word processing applications, note-taking applications, search engine-related applications, map applications, online retailer-specific applications, mobile "apps" and/or other applications. Applications 106, 108, 111 may belong to a same set of applications, e.g., at least in terms of their functionality, purpose, source/developer, etc. For example, applications 106, 108, 111 each may have a different function, e.g., news, search engine, e-mail, but may be provided and managed by a single source/developer entity (e.g., Yahoo!). As another example, applications 106, 108, 111 each may be provided by different sources, e.g., Yahoo!, CNN, BBC, but may have the same function (e.g., to provide news-related content). In some embodiments, however, applications 106, 108, 111 do not have a common functionality, feature or source/developer. Applications, 106, 108, 111 may be developed, designed and configured to execute on devices 105, 107, 110, respectively, in accordance with the configurations and requirements defined for the respective ecosystems and operating systems. However, applications, 106, 108, 111 may not be specifically meant for only one ecosystem, and may be provided by a source or developer which is a third party to the ecosystem. For example, applications, 106, 108, 111 may be Yahoo! applications (e.g., Yahoo! Mail, Yahoo! Weather, Yahoo! Messenger) that are available in Apple's ecosystem including Apple's App Store for Apple devices 105, 110, and also available from Google's ecosystem including Google's Play Store for Android device 107.

In some embodiments, applications 106, 108, 111 may be managed by user profile and app management server 120 (which may not be a part of, but external to, any specific computing ecosystem). For example, to request and install an application, a user device may send its request to server 120. Server 120 may store the requested application or may further communicate with another server to retrieve the application therefrom, and may provide the application to the user device for installation. Further, server 120 may store information related to installation and execution of applications of devices 105, 107, 110 such that the applications may be updated, personalized, re-installed, reconfigured, etc., by server 120, as needed.

In some embodiments, a user may be able to access and execute one or more of applications 106, 108, 111 by logging into the application using user-specific account information for that application. To that end, when a user executes an application for the first time, the user may be first required to create an account including set up user-specific app login credentials. The app login credentials may be stored at server 120 (e.g., in storage unit 125) and associated with a user profile (also stored at server 120) of that user. In some embodiments, for example, where applications 106, 108, 111 are from the same developer (e.g., Yahoo!), all of the applications 106, 108, 111 may be logged into using the same app login credentials (e.g., user's username and password set for all Yahoo! services), regardless of the type of device, operating system or computing ecosystem. In that sense, app login information of a user is different than the user's cloud login information needed to gain access into cloud services provided by cloud servers 135, 136. Although applications 106, 108, 111 may be configured to activate certain features or functionalities once the user logs into the applications with their app login information, the user may still be able to execute, operate, interact with, and consume content provided by, the application without logging into the application.

In some embodiments, applications 106, 108, 111 may be configured such that they are associated with a specific device identifier of the device (105, 107, and 110, respectively) on which the applications are respectively installed. The device identifier is unique for each device, and further, may also be unique for each user authorized to use the device. In some embodiments, device identifiers are used by publishers and advertisers related to the applications to anonymously track user activity with the applications and collect data about states of the applications, e.g., for ad targeting, etc. Device identifiers may be generated and provided to the devices by the respective ecosystem (e.g., via cloud servers 135, 136), or by user profile and management server 120.

In some embodiments, information related to applications of devices 105, 107, 110 may be stored at server 120, and as such, devices 105, 107, 110 may be communicatively coupled with server 120 to exchange information related to their applications as well as device-specific information. Such information may be processed by server 120 and stored in one or more user profiles. One or more of the applications may be pre-designed or pre-configured (e.g., based on JavaScript code, etc.) to keep track of user activities with the applications, and continuously collect one or more states of the applications. One or more of the installed applications may further be pre-designed or pre-configured to store the collected details about user activities and state information of the application (e.g., at device 105) at a local storage unit of device 105, and also communicate such collected details and state information from device 105 to server 120 for processing and storage (at storage unit 125).

In an implementation, recorded application-and-device-related information may include such as, but not limited to, a device type, operating system of the device, a device identifier, a type of application, (user-selected) presentation format settings of content provided by the application, (user-selected) personalized content preferences, web addresses related to or accessed using the application, timestamp information related to usage of the application, cookie information, browsing history, search query(-ies) submitted using a search engine, login information used to access the application, login information used to access the appropriate cloud server, type and number of advertisements presented via the application, user interaction with the presented advertisements (in terms of click through rate, conversion rate, etc.).

In some embodiments, user profile and app management server 120 may be configured to manage applications, and store and maintain user profiles for users of one or more devices 105, 107, 110 within one or more ecosystems 1, 2. As will be discussed in detail later, user profile and app management server 120 may be configured to create, update and maintain user profiles, in each of which user profile information related to applications and devices used by a specific user is recorded. A user profile of a specific user may provide a detailed map or overview of the various applications and devices (across one or more ecosystems) with which the specific user is associated, and which of the applications and devices are related to each other. Information recorded in a user profile may include device-related data (e.g., device identifier) and application-related data (e.g., app settings, user preferences for content and ads, etc.). In some embodiments, a user profile may be "anonymous;" in that, although the user profile may include applications-and-devices information that relate to one user or a single entity, the user profile may not include any information identifying that user or entity.

Because the information recorded in the user profiles indicates applications and devices that are related (at least in terms of being associated with a common user), user preferences or settings of one application at one device may be considered as applicable to another application at the same or another device, e.g., for content/user interface (UI) personalization and ad targeting purposes. In some embodiments, module(s) 130, which may be configured to provide services related content/UI personalization, ad targeting and/or user account security checks, may utilize the user profiles from server 120 to customize content, user interface, and/or ads across different applications on different devices for a certain user. In some other embodiments, module(s) 130 may be configured to send requests to server 120 for content/ads customization or personalization, and server 120 may be configured to process such requests based on the stored user profiles. Server 120 may then provide the personalized content or targeted ad to the applications on the user devices for the user to have a consistent customized experience. Accordingly, in accordance with the teachings of the present disclosure, user preferences for customized personalization, ad targeting, etc. for a user may be recorded from one application on one device, but based on the user profile, the user may have the same customized experience with many applications across many devices.

Figure 2A:
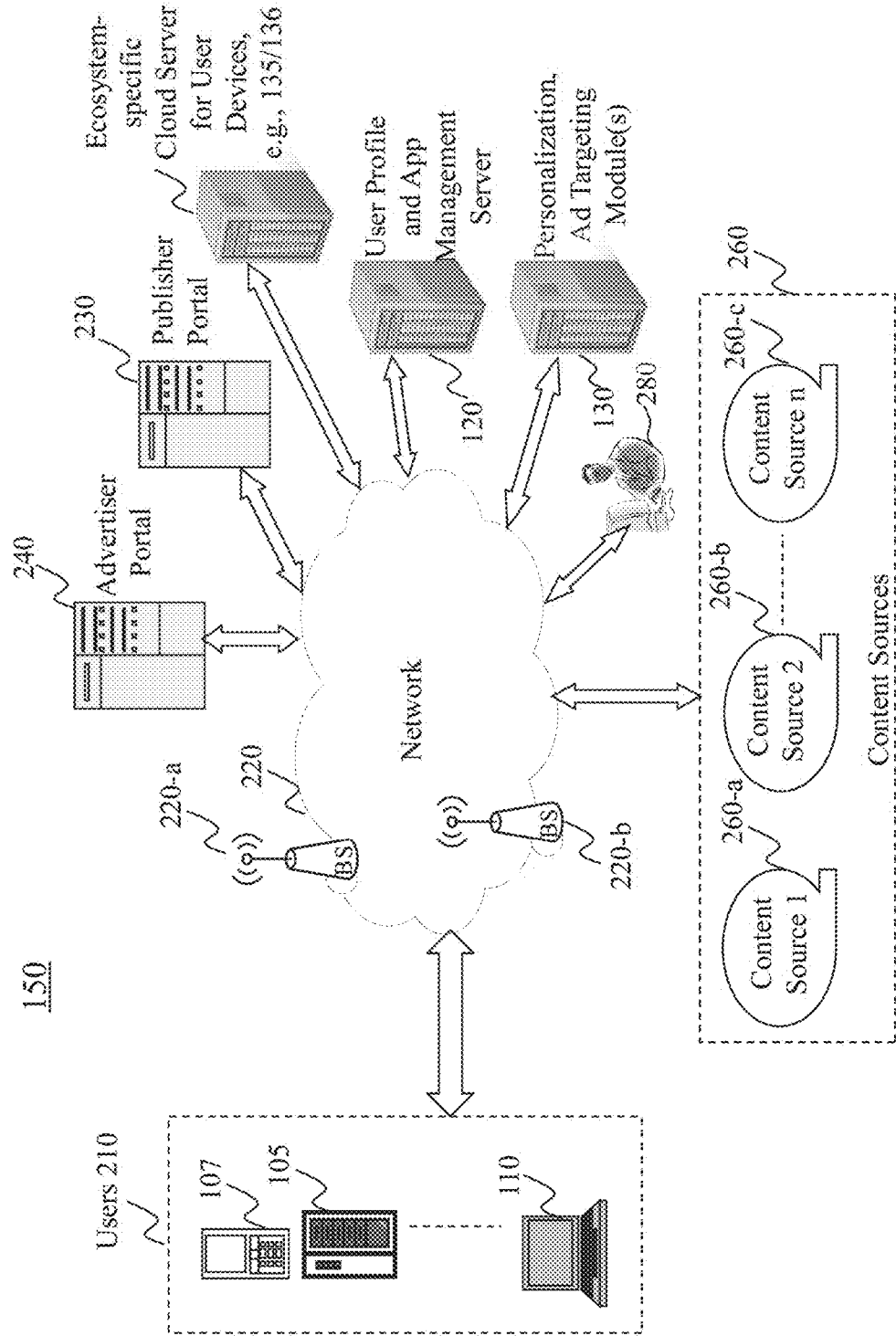
FIGS. 2(*a*), 2(*b*) illustrate examples of systems in which the user profile-related techniques are implemented in accordance with various embodiments of the present disclosure.
Figure 2B:
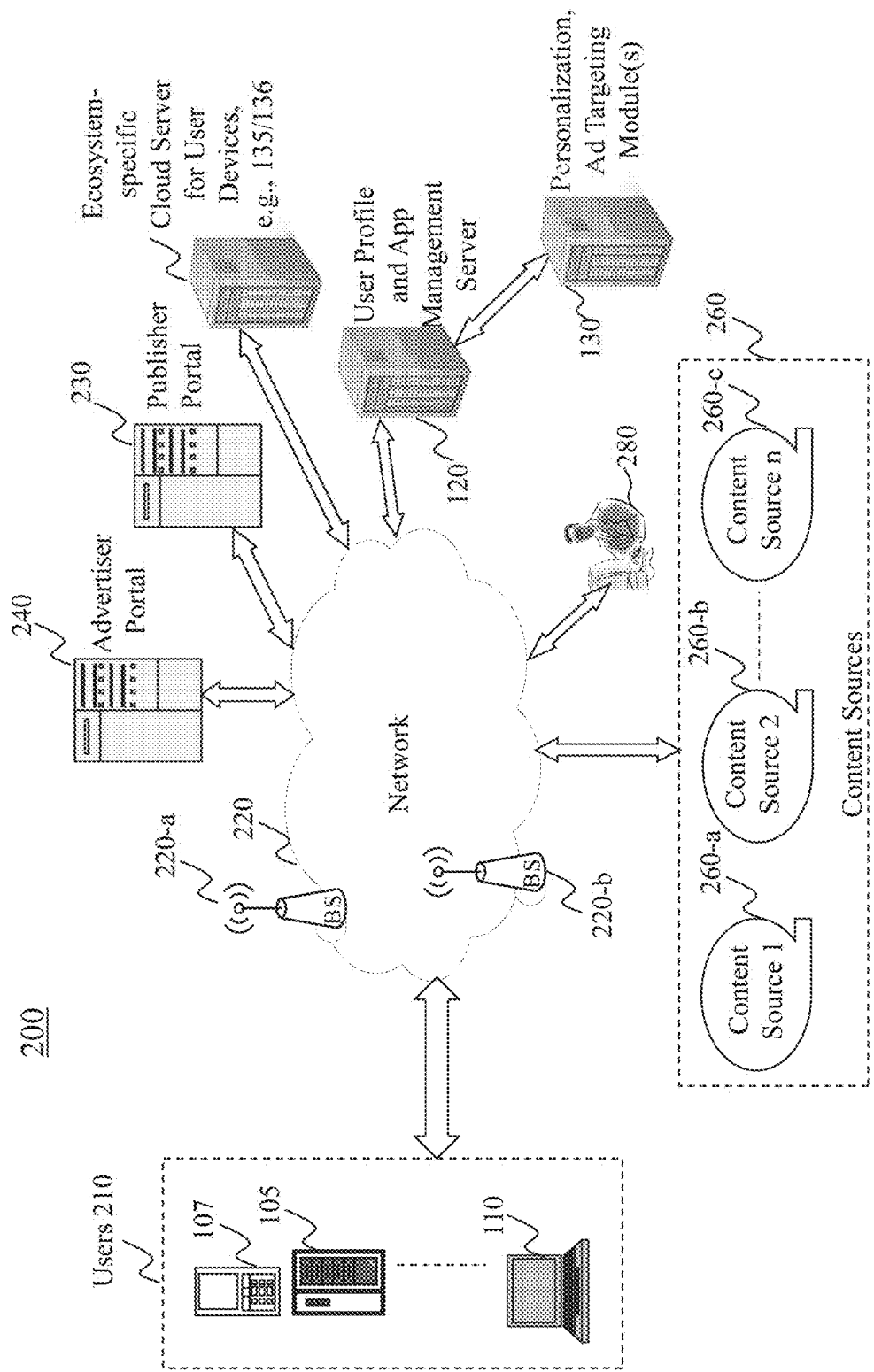

FIGS. 2(a), 2(b) are high level depiction of different system configurations in which one or more techniques to create, update and utilize user profiles may be implemented, according to one or more embodiments of the present disclosure. In FIG. 2(a), the exemplary system 150 includes users 210 (e.g., which use devices 105, 107, 110), a network 220, one or more publisher portals or publishers (or content providers) 230, one or more advertisers 240, ecosystem-specific cloud server(s) 135, 136, a user profile and app management server 120, personalization & ad targeting module(s) 130, content sources 260 including content source 1 260-a, content source 2 260-b, . . . , content source n 260-c, and a system operator/administrator 280.

User profile and app management server 120 may manage applications on devices of users 210, and store and maintain user profiles for users 210 (within one or more ecosystems 1, 2). User profile and app management server 120 may receive information about applications and devices related to a specific user 210, and based on the received information may create, update and maintain a user profile for that user 210. A user profile of a specific user 210 may provide a detailed map or overview of the various applications and devices (across one or more ecosystems) with which the specific user 210 is associated, and which of the applications and devices of user 210 are related to each other.

Information recorded in a user profile may include device-related data (e.g., device identifier) and application-related data (e.g., app settings, user preferences for content and ads, etc.). In some embodiments, a user profile may be "anonymous," where, although the user profile may include applications-and-devices information that relate to one of users 210, the user profile may not include any information identifying that user 210. In some embodiments, user profile and app management server 120 may also store app login information for user 210, and may be configured to authenticate users 210 when users 210 attempt to access and log into applications on their devices 105, 107, 110. Further, user profile and app management server 120 may be operatively associated with module(s) 130 to provide user profiles to module(s) 130 for personalization, ad targeting, security checks and/or other purposes that utilize user profile for consistent user experience across many applications.

The network 220 may be a single network or a combination of different networks. For example, a network may be a local area network (LAN), a wide area network (WAN), a public network, a private network, a proprietary network, a Public Telephone Switched Network (PSTN), the Internet, a wireless network, a cellular network, a virtual network, or any combination thereof. A network may also include various network access points, e.g., wired or wireless access points such as base stations or Internet exchange points 220-a, . . . , 220-b, through which a data source may connect to the network in order to transmit information via the network. In one embodiment, network 220 may be an online advertising network or an "ad network," which connects advertisers 240 to publishers 230 or websites/mobile applications that want to host advertisements. A function of an ad network is aggregation of ad-space supply from publishers and matching it with advertiser demand. An ad network may be a television ad network, a print ad network, an online (Internet) ad network, or a mobile ad network.

Users 210 may be of different types such as users connected to the network via devices 105, 107, 110 discussed above, e.g., including desktop connections (110-d), users connecting to network 220 via wireless connections such as through a laptop (107-c), a handheld device (105-a), or a built-in device in a motor vehicle (105-b). In one embodiment, user(s) 210 may be connected to network 220 and able to access and interact with online content (provided by the publishers 230) through wireless technologies and related operating systems and interfaces implemented within user-wearable devices (e.g., glasses, wrist watch, etc.). A user, e.g., operating device 105-a, may execute an application 106 and send a request for online content (e.g., a webpage) and/or a search query to publisher 230, via network 220 and receive content as well as one or more advertisements/ads from advertiser 240 through network 220. The online content and ads may be provided and rendered on (e.g., a display of) the user devices with a specific UI layout having multiple different UI elements (e.g., font size, font color, background color, etc.) with certain pre-configured values. The user at the device may click on or otherwise interact with the content and/or select the ad(s) to review and/or purchase the advertised products) or service(s). In the context of the present disclosure, when a user 210 executes an application 106, 108, 111 on a user device 105, 107, 110 for the first time (with or without logging into that application with preset valid credentials), the application and/or the device may transmit device- and application-related information to server 120 to create or update the user profile for user 210 at server 120.

In some embodiments, each user 210 may be required to create one or more online/web accounts for one or more sets of applications on user 210's device(s). This online account may be different and separate from one or more cloud-based accounts that user 210 may use to access cloud servers 135, 136 from their device(s). Each application account for user 210 may be associated with unique login credentials (e.g., username and password) which are stored at server 120. Server 120 may be configured to validate user 210's login credentials when the user attempts to log into the application (s), and also add user 210's login credentials as part of the user 210's profile.

Publishers 230, may correspond to an entity, whether an individual, a firm, or an organization, having publishing business, such as a television station, a newspaper issuer, a web page host, an online service provider, or a game server. For example, in connection to an online or mobile ad network, publishers 230 may be an organization such as USPTO.gov, a content provider such as CNN.com and Yahoo.com, or a content-feed source such as Twitter or blogs. In one embodiment, publishers 230 include entities that develop, support and/or provide online content via mobile applications (e.g., installed on smartphones, tablet devices, etc.). In one example, the content sent to devices 105, 107, 110 for users 210 may be generated or formatted by publishers 230 based on data provided by or retrieved from content sources 260. A content source may correspond to an entity where the content was originally generated and/or stored. For example, a novel may be originally printed in a magazine, but then posted online at a web site controlled by a publisher. The content sources 260 in the exemplary networked environment 150 include multiple content sources 260-1, 260-2 . . . 260-3.

The online content and ads provided by the publishers 230 may be presented in applications 106, 108, 111 of user devices 105, 107, 110 in accordance with one or more user-defined preferences, previous user activity with content/ads, user profile, device's characteristics (IP address, MAC address, etc.) and/or other factors. Further, the content/ads from the publishers 230 may be associated with a number of UI elements that define the overall presentation of the online content/ads on the user device. For example, the UI elements related to websites, webpages or apps include, but not limited to, font size, font style, font color, bold (or other emphasis) on certain portions of text, page layout, background color, background images, border color, border style, border size, mouse-over behavior, icon/button arrangements, icon/button size, icon/button shape, menu color, length of text of search results, length of each field, truncation/shortening rules, animation/multimedia effects and image/thumbnail placement rules.

Advertisers 240, generally, may correspond to an entity, whether an individual, a firm, or an organization, doing or planning to do (or otherwise involved in) advertising business. As such, an advertiser 240 may be an entity that provides product(s) and/or service(s), and itself handles the advertising process for its own products) and/or service(s) at a platform (e.g., websites, mobile applications, etc.) provided by a publisher. For example, advertisers 240 may include companies like General Motors, Best Buy, or Disney. In some other cases, however, an advertiser 240 may be an entity that only handles the advertising process for product(s) and/or service(s) provided by another entity.

Advertisers 240 may be entities that are arranged to provide online advertisements to publisher(s) 230, such that those advertisements are presented to the user 210 with other online content at the user device. Advertisers 240 may provide streaming content, static content, and sponsored content. Advertising content may be placed at any location on a content page or mobile app, and may be presented both as part of a content stream as well as a standalone advertisement, placed strategically around or within the content stream. In some embodiments, advertisers 240 may include or may be configured as an ad exchange engine that serves as a platform for buying one or more advertisement opportunities made available by a publisher (e.g., publisher 230). The ad exchange engine may run an internal bidding among multiple advertisers associated with the engine, and submit a suitable bid to the publisher, after receiving and in response to a bid request from the publisher.

The content sources 260 may include multiple content sources 260-a, 260-b, . . . , 260-n. A content source may correspond to a web page/app host corresponding to a publisher (e.g., publisher 230) an entity, whether an individual, a business, or an organization such as USPTO.gov, a content provider such as CNN.com and Yahoo.com, or content feed source such as Twitter or blogs. Content sources 260 may be any source of online content such as online news, published papers, blogs, on-line tabloids, magazines, audio content, image content, and video content. It may be content from a content provider such as Yahoo! Finance, Yahoo! Sports, CNN, and ESPN. It may be multimedia content or text or any other form of content comprised of website content, social media content, such as Facebook, Twitter, Reddit, etc., or any other content rich provider. It may be licensed content from providers such as AP and Reuters. It may also be content crawled and indexed from various sources on the Internet. Content sources 260 provide a vast array of content to publishers 230 and/or other parts of system 150.

In some implementations, a different type of user such as user 280, which may be a system operator or an administrator, may also be able to interact with different components of system 200 for different administrative jobs such as managing the server 120, etc. In some embodiments, user 280 may be classified to have a higher privilege to manage server 120 on more operational issues than user 210. For example, user 280 may be configured to be able to update the indexing scheme or format of data stored in a database 125 of server 120, and the format of data received from devices 105, 107, 110. In some embodiments, server 120 may be part of a third party service provider so that the publishers 230, advertisers 240, cloud servers 135, 136, module(s) 130 may be customers of server 120.

FIG. 2(b) presents a similar system configuration 200 as what is shown in FIG. 2(a) except that module(s) 130 are directly connected to server 120. It is noted that different configurations as illustrated in FIGS. 2(a), 2(b) may also be mixed in any manner that is appropriate for a particular application scenario. For example, in some embodiments, publishers 230, advertisers 240, and users 210 may be connected (directly or via the network 220) to a database connected to server 120, which maintains and updates users' account information and user profiles for applications on devices of user 210. Further, in some embodiments, one or more functionalities and configurations of server 120 may be integrated within a publisher 230, such that publisher 230 may provide the "user-profile" features (as described in the present disclosure) for its own users as well to users of other publishers 230 and/or advertisers 240.

Figure 3:
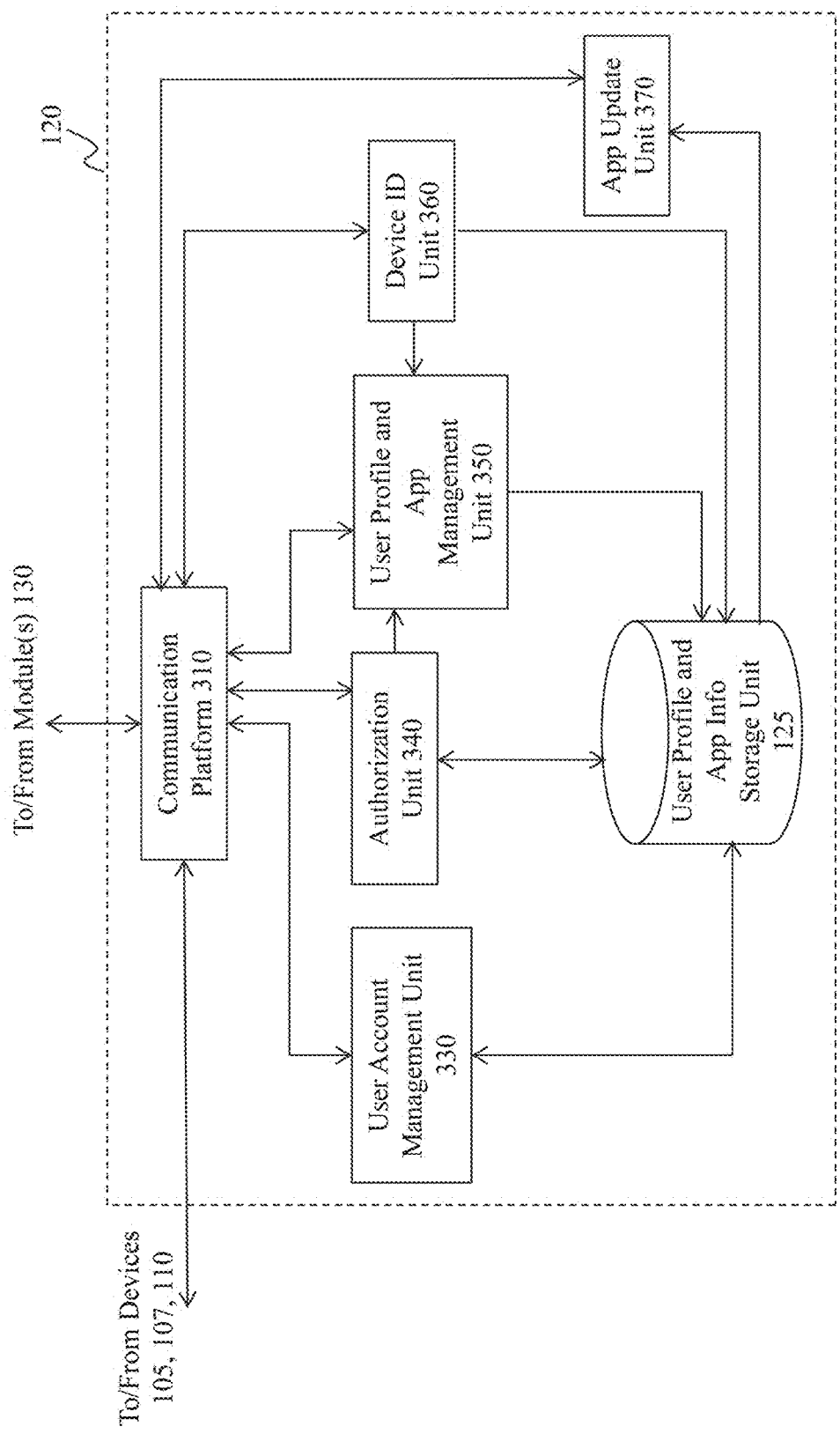
FIG. 3 illustrates an example of a user profile and app management server, in accordance with various embodiments of the present disclosure.

FIG. 3 illustrates a high level depiction of an exemplary user profile and app management server 120, according to an embodiment of the present disclosure. As shown, user profile and app management server 120 may include a communication platform 310, a user profile and app info storage unit 125, a user account management unit 330, an authentication/authorization unit 340, a user profile and app management unit 350, a device ID unit 360, an app update unit 370, and/or other components and units.

Communication platform 310 may be configured as a data interface for server 120 to networks, devices, and other components of a system where the present teachings are implemented. For example, communication platform 310 may be configured to receive user account information, login credentials, application-related information, device-related information, information about user activity with applications' content/ads, etc., e.g., from device(s) 105, 107, 110 and their applications, and transmit user authentication confirmation, user profiles, content/ads (e.g., customized content or targeted ad from publishers 230, advertisers 240, etc.), e.g., to device(s) 105, 107, 110 or to module(s) 130. For such information reception and transmission, communication platform 310 may be configured in accordance with one or more network protocols (e.g., TCP/IP, etc.) and/or one or more communication protocols (e.g., wireless protocols, such as CDMA, LTE, etc.).

Figure 5:
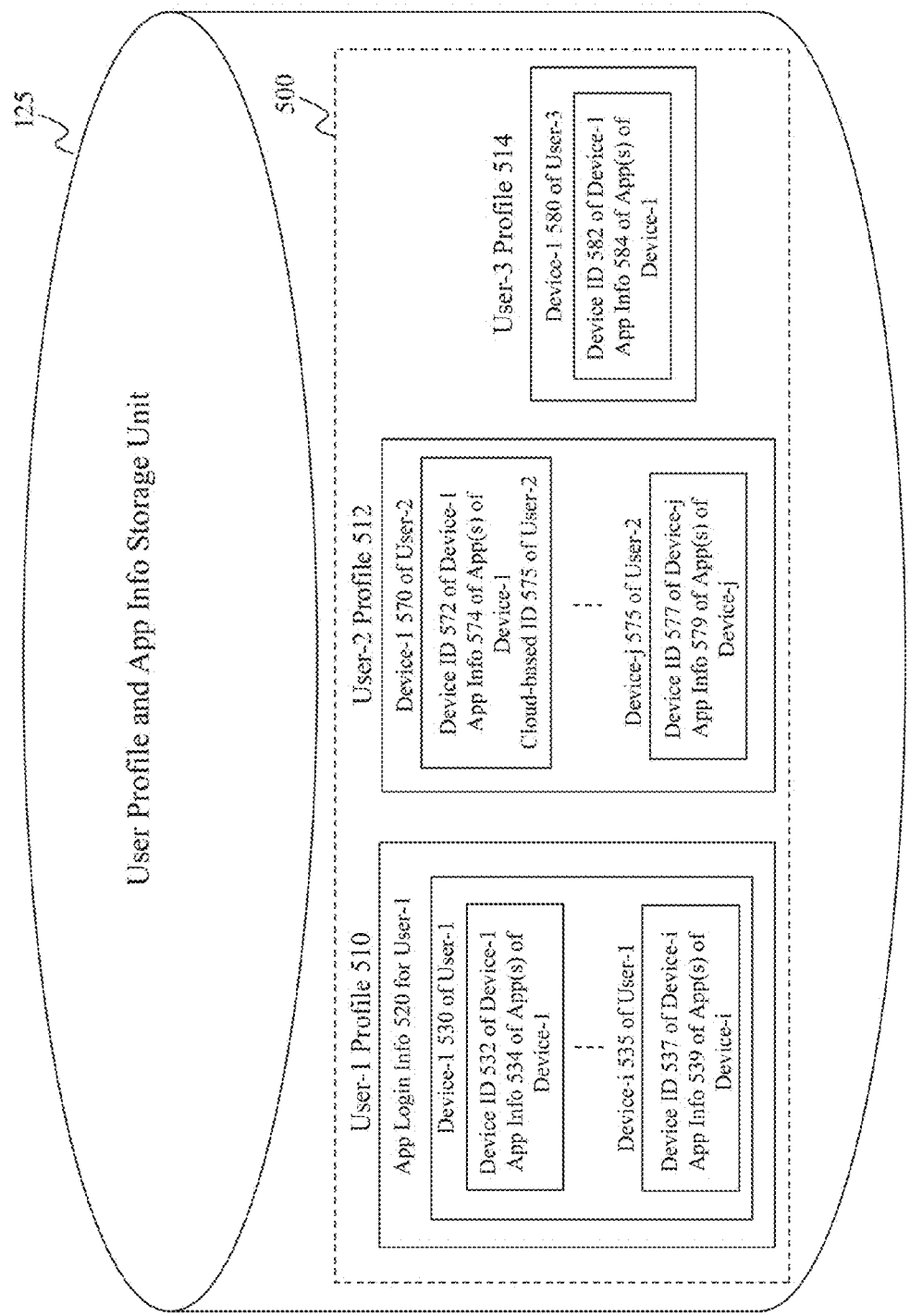
FIG. 5 illustrates an example of a data structure including user profiles at a storage unit, in accordance with various embodiments of the present disclosure.

User profile and app info storage unit 125 may format and store user profiles and application information in relation to (or in a form which is arranged around) a specific entity of system 100. For example, user profile and app info storage unit 125 may store data as "user-centric," in which the storage unit 125 may create a data structure 500 (in a database, for example), as shown in FIG. 5. Data structure 500 may include user profiles 510, 512, 514 for different users 210, referenced as "user-1," "user-2," and "user-3," in this example. A user profile, e.g., user-1 profile 510, may include user-1's app account/login information 520 associated with one or more of applications 106, 108, 111 installed on one or more of user-1's devices 105, 107, 110, respectively. As discussed above, different applications (e.g., Yahoo! Mail, Yahoo! Maps, etc.) on different devices may be accessed by a user using the same app login information (e.g., user-1's Yahoo! username and password). Further, associated with the app login information 520 of the user, user-1 profile 510 may include user-1's device-related information and app-related information. For example, user-1 profile 510 may include information related to device-1 530 (e.g., one of devices 105, 107, 110) that indicates a device identifier (or "ID") 532 of device-1 530 as well as information 534 about one or more applications (e.g., applications 106, 108, 111) installed on device-1 530.

In some embodiments, device ID 532 is unique for device-1 530, and further, may also be unique for each user (e.g., user-1) who is authorized to use device-1 530. In some embodiments, device identifiers (e.g., device ID 532) are used by publishers and advertisers related to the applications to anonymously track user activity with the applications and collect data about states of the applications, e.g., for personalization, ad targeting, etc. Device identifiers may be generated and provided to the devices by the respective ecosystem (e.g., via cloud servers 135, 136), or by user profile and management server 120 (e.g., using device ID unit 360). In some embodiments, device ID 532 may be (or may be associated with) "advertising ID" provided by Google Play services for Android devices. Alternatively, device ID 532 may be (or may be associated with) "Advertising Identifier" provided by Apple (in related to its iCloud services). In addition to, or instead of, device ID 532, device-related information for device-1 530 may include device-1 530's IP address, MAC address, information indicating type of device, operating system installed on the device, and/or other device-specific information.

In some embodiments, app information 534 may include information about each application installed on device-1 530, for example, but not limited to, application name, type, functionality, source/vendor info, installation date and time, logs about user activity with the application (e.g., cookies), browsing history, specific authentication, content-personalization, UI-personalization and/or ad-related settings or preferences provided by user-1 for that application, and/or other application-specific information.

User-1 profile 510 may further include information related to device-i 535 (e.g., one of devices 105, 107, 110) that indicates a device ID 537 of device-i 535 as well as information 539 about one or more applications (e.g., applications 106, 108, 111) installed on device-i 535. In some embodiments, device ID 537 and app information 539 of device-i may be similar (in terms of the format and type of content) to device ID 532 and app information 534, respectively.

Although user-1 profile 510, as shown, includes device and app-related information for each device indexed under app login information 520, such format is not limiting or restrictive. For example, user-1 profile 510 may include information indexed with respect to device-1 530 information, and information of all other devices (e.g., device-i 535) of user-1 may be stored as a subset of device-1 530's information. One or more of other formats may be applicable to store user profiles in data structure 500.

Further, a user profile 512 of another user, e.g., user-2, may include user-2's device-related information and app-related information, without associating user-2's app login information therewith. For example, user-2 profile 512 may include information related to device-1 570 and device-j 575 (e.g., devices 105, 107, 110) that belong to or used by user-2. Profile information related to device-1 570 and device-j 575 may respectively indicate device ID 572 of device-1 570 and device ID 577 of device-j 575 as well as information 574, 579 about one or more applications (e.g., applications 106, 108, 111) installed on device-1 570 and device-j 575, respectively. In some embodiments, device ID 572, 577 and app information 574, 579 related to their respective devices may be similar (in terms of the format and type of content) to device ID 532 and app information 534, respectively, as described above.

In some embodiments, profile information related to a user device, e.g. device-1 570, may also include a cloud-based identifier, e.g., cloud-based ID 575 of user-2. Cloud-based ID 575 may be associated with login information that user-2 uses to access a certain cloud network via device-1

570. For example, if device-1 570 is an Android device configured to be operational with Google's cloud network, cloud-based ID 575 may be the user-2's username for his/her Google account, a Google Play services token associated with user-2's Google account, and/or an e-mail address generated based on the Google Play services token.

Similar to user profiles of user-1 and user-2, data structure 500 may include user profile 514 for user-3, where user-3 may access or own only a single device, e.g., device-1 580. User-3 profile 514 may include information related to device-1 580 indicating device ID 582 of device-1 580 as well as information 584 about one or more applications (e.g., applications 106, 108, 111) installed on device-1 580. In some embodiments, device ID 582 and app information 584 may be similar (in terms of the format and type of content) to device ID 532 and app information 534, respectively, as described above.

In some embodiments, app account information and user profile information for one or more users may be created, maintained, updated, retrieved and provided from data structure 500 by one or more modules of user profile and app management server 120. For example, user profile and app info storage unit 125 may be operatively associated with user account management unit 330 and authentication unit 340 to enable creation of new accounts for applications on user devices, and authenticating whether incoming app login credentials are valid. User profile and app info storage unit 125 may also be operatively associated with user profile and app management unit 350, device ID unit 360 and app update unit 370 to receive, update and provide user profile information to/from the user devices as well as module(s) 130.

User account management unit 330 is configured to create and maintain app accounts for individual users with regard to their access to one or more applications (or sets of applications) installed on one or more user devices (e.g., applications 106, 108, 111 on user devices 105, 107, 110).

Each new app account for a certain user created by user account management unit 330 is associated with specific app login credentials applicable to certain applications (e.g., a unique username-password pair assigned to a certain user for accessing Yahoo! apps on his/her devices). Such app login credentials may be received at communication platform 310, and forwarded to user account management unit 330 for further processing. User account management unit 330 may store the received app login credentials in data structure 500 in storage unit 125 as part of a user profile, and/or stored in another part of storage unit 125 (not shown) in which only app login information for all users are stored. User account management unit 330 may be further configured to delete, change or update the existing app accounts and information stored therein, e.g., in response to corresponding requests from the user. User account management unit 330 may also group or tag various app accounts (stored at storage unit 125) based on one or more characteristics of those user accounts, e.g., based on a type of device (laptop, smartphone, etc.), a type of operating system on the device, a type and/or a number of applications on user devices, geographical location of the users, etc.

Authentication unit 340 may authenticate or validate the user's app login information. For example, the user may execute an application on a user device, and provide the user credentials (e.g., the username-password pair established at the time of account creation) to server 120. The credentials may be received at communication platform 310, and forwarded to authentication unit 340 for further processing and validation. Authentication unit 340 may then communicate with storage unit 125 to search, extract or compare the user credentials with the app account information stored therein. Based on the comparison with the stored user account information, authentication unit 340 may determine whether the requesting user is authorized to log into and access the application on the user device. If the app login information provided by the user is not valid, the user may still be able to interact with the application (e.g., consume the content provided via the application) on the user device, but may not be able to activate user preferences for content, user interface, ad targeting, etc.

User profile and app management unit 350 may be configured to create, maintain and update user profiles (as illustrated and discussed with respect to in FIG. 5), each of which provides a map or overview of the various applications and devices (across one or more ecosystems) with which a specific user is associated, and which of the applications and devices are related to each other. For example, when a user launches or executes an application 106 on his/her device 105 (where the user is logged on to an associated cloud network server 135 via device 105, but may or may not be logged on to application 106), device-related information (e.g., device ID of device 105) and information related to the executed application 106 may be transmitted from device 105 to server 120 and received at communication platform 310. In some embodiments, a cloud-based ID associated with the user's access to the cloud network server 135 may also be received from device 105. Communication platform 310 may forward such received information to user profile and app management unit 350 for further processing. In addition to executing application 106, if the user also logs into application 106 using pre-established app login credentials, authorization unit 340 may validate app login credentials, and forward the validated app login credentials to user profile and app management unit 350 for further processing.

In operation, based on the existing user profiles in storage unit 125, user profile and app management unit 350 may determine whether a user profile having the received device ID of device 105 exists. If such a user profile does exist, unit 350 may update that user profile in storage unit 125 with the received app-related information of application 106. If such a user profile does not exist, unit 350 may create a user profile (e.g., similar to user profile 510, 512, 514) specific to the user, and record, in the user profile, the device ID of device 105 and information related to application 106, and optionally, the cloud-based ID. If the user profile does not need to be anonymous, unit 350 may also associate app login credentials (used to access application 106) with the user profile. Unit 350 may store the newly-created user profile in data structure 500 at storage unit 125.

Further, the same user (of device 105) may also be operating or using another device, e.g., device 107 or 110, and logged into the cloud server 135 or 136 via the other device. When that user launches or executes application 108 or 111 on the other device 107 or 110, the other device 107 or 110 may transmit to server 120 a query asking whether the existing user profiles include a user profile having the device ID of the previous device 105 or the cloud-based ID related to the cloud network server 135 or 136. User profile and app management unit 350 may receive (via platform 310) and process that query by accessing the user profiles at storage unit 125, and comparing the device ID or cloud-based ID information in the user profiles to determine whether one of those user profiles includes the device ID of device 105 or the cloud-based ID identifier.

Responsive to identifying a user profile, e.g., say, user profile 512, that includes the device ID of device 105 or the cloud-based ID, user profile and app management unit 350 may infer that both device 105 (i.e., the previous device) and device 107 or 110 (i.e., the querying new device) are operated by and associated with the same user. User profile and app management unit 350, via platform 310, may transmit a confirmation message to the querying device 107 or 110 that a user profile with device ID of device 105 or cloud-based ID does exist. Upon receiving the confirmation, device 107 or 110 may transmit to server 120 its own device-based information (e.g., device ID) and app-related information about the executed application 108 or 111. User profile and app management unit 350 may update the identified user profile 512 by adding the device ID and app-related information from device 107 or 110 in user profile 512. Accordingly, the updated user profile may indicate the various applications and devices with which a certain user is associated. Based on such user profiles, personalization or ad targeting services may be able to apply application-related user preferences for content and ads consistently across different devices (within a same ecosystem or on different ecosystems).

In some embodiments, devices 105, 107, 110 may not provide their device IDs to server 120, but may provide other device-related information, e.g., IP address, MAC address, etc. In that case, device ID unit 360 may generate a unique device ID (e.g., a randomly-generated string) for each device based on the corresponding device-related information (received via platform 310). Device ID unit 360 may provide the generated device IDs to user profile and app management unit 350 for use in creating and/or updating user profiles at storage unit 125.

Because the information recorded in the user profiles indicates applications and devices that are related (at least in terms of being associated with a common user), user preferences for content/ads for one application at one device (e.g. application 106 at device 105) may be considered as applicable to another application at the same or another device (e.g., application 111 at device 110). In some embodiments, module(s) 130, which may be configured to provide content/UI personalization service and/or ad targeting service, send requests to server 120 for content/ads customization or personalization for a certain user, based on that user's profile. Such requests may include device ID of the user device (e.g., device ID 537) and information identifying applications (e.g., of device-2 535), which are to be personalized or presented with targeted ads.

The requests may be received at platform 310 that may forward the requests to app update unit 370. App update unit 370 may process the request by identifying the device ID 537 in the request, and performing a search in the storage unit 125 for a user profile that includes device ID 537. If a matching user profile is found, e.g., user profile 510, app update unit 370 may retrieve user profile 510 from storage unit 125, and extract, from the user profile, complete app-related information for all of the applications (and not just app info 539) that are included in user profile 510. The app-related information, as indicated by app info 534, 539 in user profile 510, indicate user preferences for content/UI personalization and/or ad targeting across different devices 530, 535. App update unit 370 may apply the user preferences from app info 534, 539 on the application(s) of device-2 535, such that the content, UI details and/or ads for those applications are customized in accordance with a complete set of user preferences (and not just in relation to device-2 535). App update unit 370 may transmit, via platform 310, the customized content, UI and/or ads to device-2 535 for rendering through the application on the device.

Figure 4:
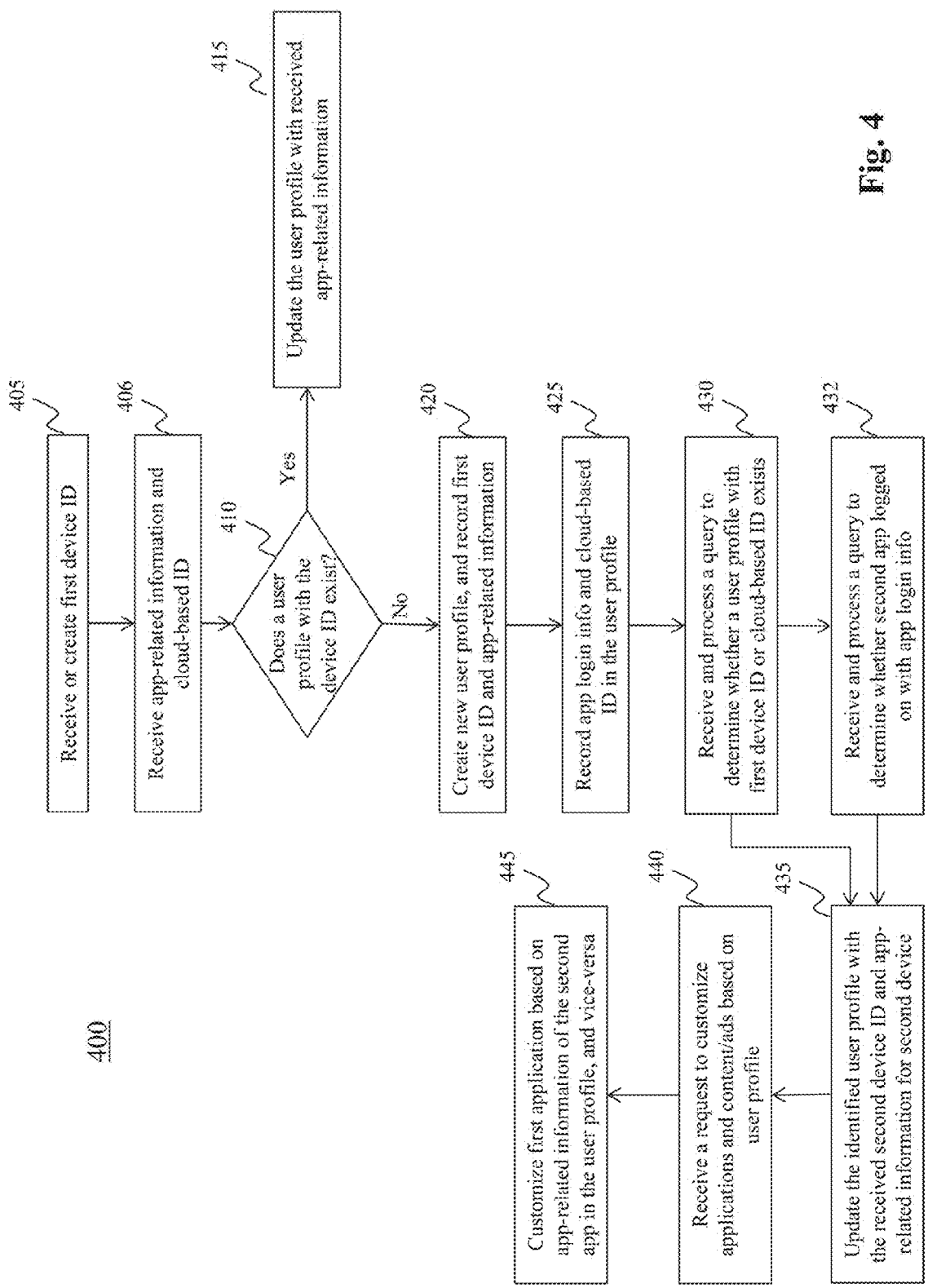
FIG. 4 is a flowchart of an exemplary process for creating and updating a user profile of a certain (same) user, in accordance with various embodiments of the present disclosure.

FIG. 4 depicts a flow chart for a method 400 to create and update a user profile indicating various applications and devices used by a certain (same) user, according to an embodiment of the present teaching. Method 400 begins at operation 405, in which, responsive to an execution of a first application (e.g., app 106) on a first device (e.g., device 105), device-related information (e.g., device ID of device 105) may be received. If device ID is not received in device-related information, device ID may be generated, e.g., by device ID unit 360. Further, in operation 406, app-related information for application 106 and cloud-based ID associated with the user's access to cloud network server 135 via device 105 may be received. In method 400, further to launching or executing the first application 106, the user may or may not be logged into the application 106 using pre-established app login information.

In operation 410, it may be checked whether a user profile with the first device ID of device 105 already exists in storage unit 125. If "yes," then, in operation 415, that user profile may be updated with the received app-related information. If "no," then, in operation 420, a user profile is created, and the first device ID of device 105 and app-related information is added to the new profile. If the app login information for the application 106 and cloud-based ID associated with the user is known or received, those information may also be added to the newly-created user profile, in operation 425.

Further, the user may be logged on to the cloud network server 135 via a second device 110, and a second device ID may be associated with the second device 110. In operation 430, responsive to an execution of a second application 111 on the second device 110, a query is received and processed to determine whether a user profile with the first device ID, or the cloud-based ID already exists. Alternatively, if the user is logged-on into the first application 106 and second application 111 using app login credentials, in operation 432, it is determined whether the first and second applications are being logged-on into with the same unique app login credentials (or in other words, by the same user).

If the result of the operation 430 indicates that the user profile exists or if the result of the operation 432 indicates that the same user has logged into the first and second applications, in operation 435, device ID and app-related information of the second device are received from the second device, and the matching/corresponding user profile is updated with that received second device information.

In operation 440, a request to customize applications and content/ads based on a user profile is received from module (s) 130. In operation 445, based on the app-related settings and configurations specified in the user profile for the second application 111, the first application 106 may be customized in terms of its content, user interface and/or targeted ads. Similarly, based on the app-related settings and configurations specified in the user profile for the first application 106, the second application 111 may be customized in terms of its content, user interface and/or targeted ads.

Figure 6:
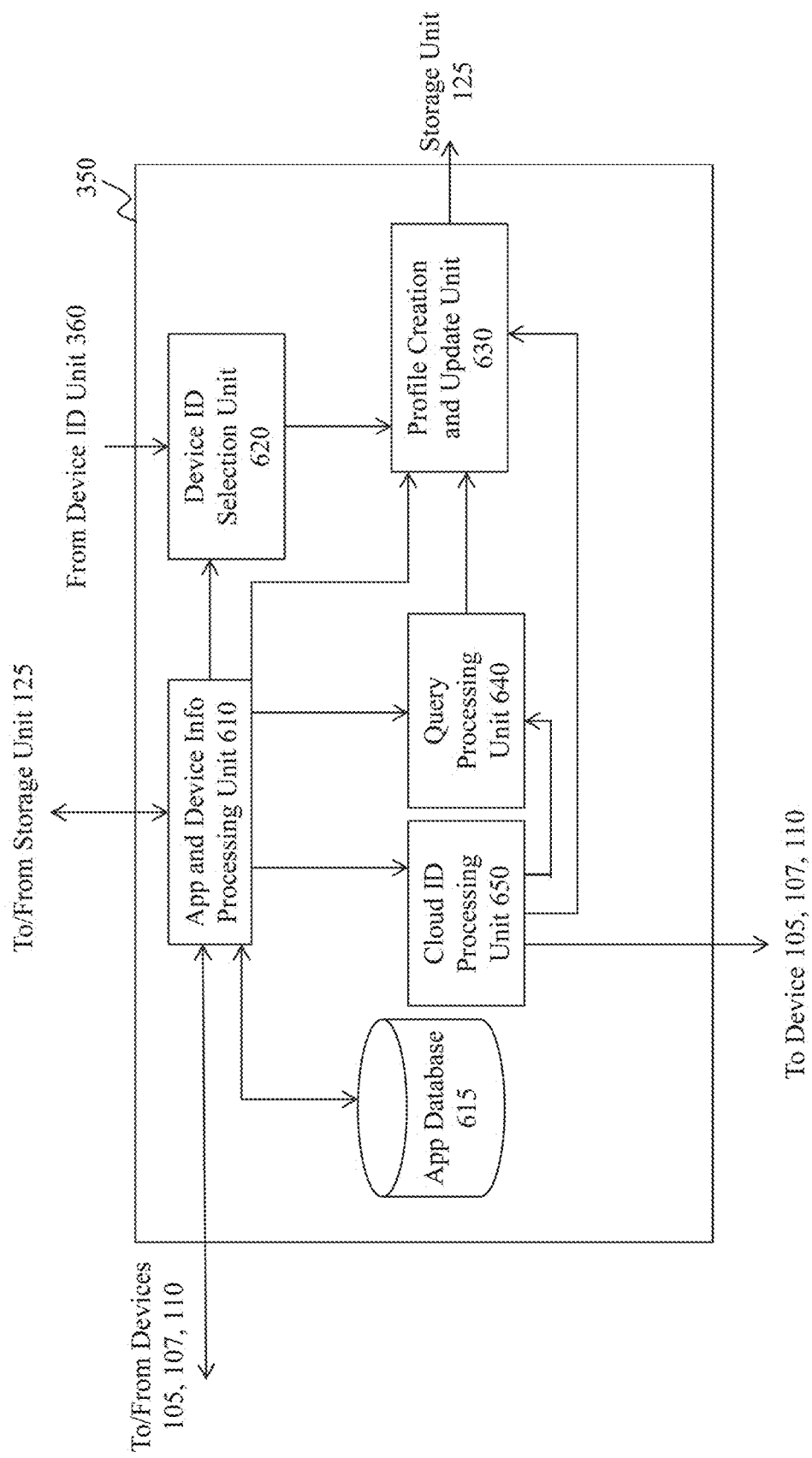
FIG. 6 illustrates an example of a user profile and app management unit, in accordance with various embodiments of the present disclosure.

FIG. 6 illustrates a high level depiction of an exemplary user profile and app management unit 350, according to an embodiment of the present disclosure. As shown, user profile and app management unit 350 may include app and device info processing unit 610, app database 615, device ID selection unit 620, profile creation and update unit 630, query processing unit 640, cloud ID processing unit 650, and/or other components and units.

In some embodiments, app and device info processing unit 610 receives device-related information (e.g., device ID) and information related to an executed application transmitted from a user device, e.g., device 105. App and device info processing unit 610 may also receive a cloud-based ID associated with the user's access from device 105 to the cloud network server 135. For example, if device 105 is an Apple device, e.g., iPhone, iPad, etc., cloud-based ID may be iCloud Keychain created by the iCloud network for the user. In another example, if device 105 is an Android device, cloud-based ID may be Google Play services token associated with the user's Google account. Further, if the user logs into application 106 using pre-established app login credentials, upon validation, app and device info processing unit 610 may also receive the validated app login credentials. App and device info processing unit 610 may processed the received information to separate out device information, app information, cloud information, etc., and forward those information to various components of user profile and app management unit 350.

For example, unit 610 may provide the received device ID to device ID selection unit 620, which also receives a device ID (for the same device) generated by device ID unit 360. Device ID selection unit 620 is configured to select one of the two device IDs, e.g., for device 105, and forward the selected device ID to profile creation and update unit 630. Profile creation and update unit 630 also receives information including app-related information from unit 610. In operation, profile creation and update unit 630 may create a user profile (e.g., similar to user profile 510, 512, 514) specific for the user of device 105, and record, in the user profile, the device ID of device 105 and the received app-related information. For Android (or Google-based) devices, profile creation and update unit 630 may also include cloud-based ID to the user profile. Further, if the user profile does not need to be anonymous, unit 630 may also associate app login credentials (used to access application 106) with the user profile. The newly-created user profile may be stored in data structure 500 at storage unit 125.

In some embodiments, cloud ID processing unit 650 receives cloud-based ID from unit 610 (that was sent by the user device). As discussed above, for Apple devices, cloud-based ID may be iCloud Keychain for the user, and for Android devices, cloud-based ID may be Google Play services token associated with the user's Google account. For an Android device 105, cloud ID processing unit 650 may be configured to process the Google Play services token by mapping the token to an email address unique to the user of device 105. In this case, cloud ID processing unit 650 may provide the processed cloud-based ID, i.e., the email address, to profile creation and update unit 630, which may include (in addition to the device ID and app-related information) the email address to the profile of the user of device 105.

In another embodiment, for an Apple device 105, cloud ID processing unit 650 may be configured to update the iCloud Keychain data by including the device ID of device 105 therein, and transmitting, via platform 310, the updated iCloud Keychain back to device 105. In some embodiments, once the user of device 105 logs into the iCloud network server 135 via another Apple device 110, the updated iCloud Keychain is propagated from device 105 to device 110 via iCloud network server 135. To that end, device 110 reads the updated iCloud Keychain, and is able to know and extract the device ID of device 105.

Once the user executes application 111 at device 110 (regardless of whether the user logs into application 111 with app login credentials), device 110 may transmit a query asking whether the existing user profiles at server 120 include a user profile for that user. For example, for an Android device 110 where the user is logged into the Google's cloud network server, the query from device 110 is for determining whether the existing user profiles include a user profile having the cloud ID based on Google Play services token associated with the user. In another example, for an Apple device 110 where the user is logged into the iCloud network server and which device is aware of the device ID of device 105, the query from device 110 is for determining whether the existing user profiles include a user profile having the device ID of device 105.

Query processing unit 640 may receive such query (via platform 310 and unit 610), and process the query by comparing the device ID (in case of an Apple device), or the email address from Google token (in case of an Android device), indicated in the query to the device IDs or email addresses in the user profiles to determine whether one of those user profiles includes the same device ID or email address. Once a matching user profile is found and identified, responsive to the query, query processing unit 640 may send a confirmation message to device 110 indicating success. Query processing unit 640 may also send an indication to profile creation and update unit 630 that a query regarding the identified user profile has been successfully processed, and the identified user profile (for device 105) may need to be updated.

Upon receiving the confirmation message, device 110 may transmit its own device-based information (e.g., device ID) and app-related information about the executed application 111 to server 120. App and device info processing unit 610 may receive and forward the device-based information and app-related information to profile creation and update unit 630 with an indication that this information is to be used to update the existing user profile including device 105's information. Profile creation and update unit 630 may update the identified user profile by adding therein the device-based information and app-related information from device 110. Accordingly, the updated user profile indicates information related to the various applications (e.g., applications 106, 111) and devices (e.g., devices 105, 110) with which a certain user is associated. Based on such user profiles, personalization or ad targeting services may be able to apply application-related user preferences for content and ads consistently across different devices (within a same ecosystem or on different ecosystems).

Figure 7:
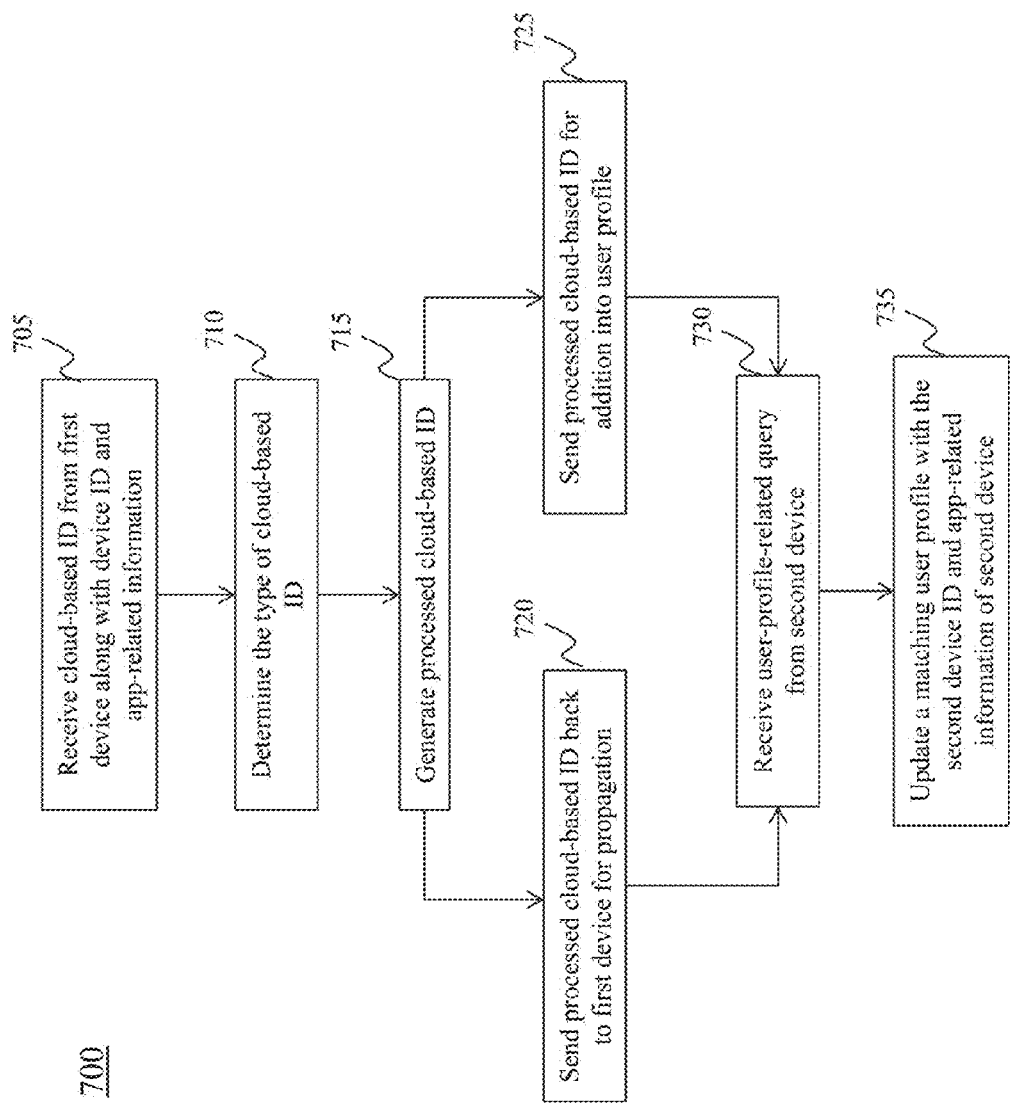
FIG. 7 is a flowchart of an exemplary process for processing cloud-based ID and updating a user profile of a certain user, in accordance with various embodiments of the present disclosure.

FIG. 7 depicts a flow chart for a method 700 to update a user profile of a certain user, according to an embodiment of the present teaching. Method 700 begins at operation 705, in which (similar to operation 405), cloud-based ID along with device ID and app-related information may be received from first device 105. In operation 710, a type of cloud-based ID may be determined. For example, for an Apple device 105, cloud-based ID may be iCloud Keychain associated with the user, and for an Android device 105, cloud-based ID may be Google Play services token associated with the user's Google account.

In operation 715, based on its determined type, the cloud-based ID may be processed to generate a processed cloud-based ID. For example, for an Android device 105, the Google Play services token may be processed by mapping the token to an email address (i.e., the processed cloud-based ID) which is unique to the user of device 105. In this case, in operation 725, the email address is added to the user profile related to device 105 (the user profile also has the device ID and app-related information related to device 105).

In another example, in operation 715, for an Apple device 105, the iCloud Keychain data may be updated by including the device ID of device 105 in the Keychain. In operation 720, the updated iCloud Keychain is sent back to device 105. In some embodiments, once the user of device 105 logs into the iCloud network server 135 via another Apple device 110, the updated iCloud Keychain is propagated from device 105 to device 110 via iCloud network server 135. To that end, device 110 reads the updated iCloud Keychain, and is able to know and extract the device ID of device 105.

In operation 730, a query based on the updated cloud-based ID is received from the second device 110 to determine whether a matching or target user profile already exists. In operation 735, the target user profile (having device ID of device 105 or cloud-based ID of the user) is updated with the device ID and app-related information of the second device 110.

Figure 8:
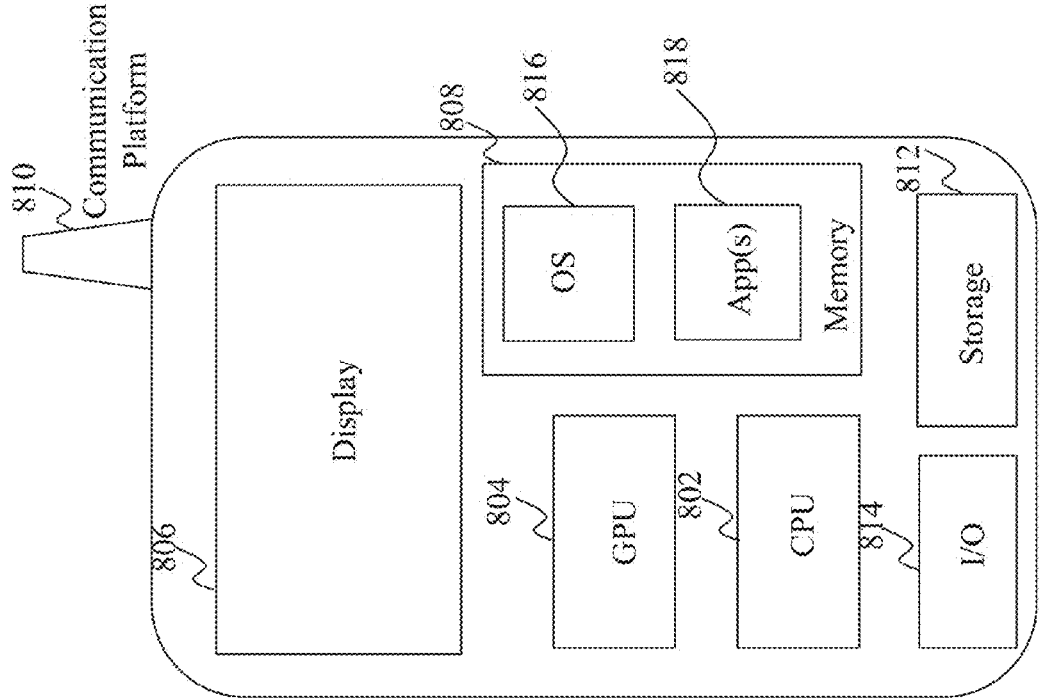
FIG. 8 depicts the architecture of a mobile device which can be used to implement a specialized system incorporating teachings of the present disclosure.

FIG. 8 depicts the architecture of a mobile device which can be used to realize a specialized system implementing the present teaching. In this example, the user device on which content and advertisement are presented and interacted-with is a mobile device 800, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 800 in this example includes one or more central processing units (CPUs) 802, one or more graphic processing units (GPUs) 804, a display 806, a memory 808, a communication platform 810, such as a wireless communication module, storage 812, and one or more input/output (I/O) devices 814. Any other suitable component, including but not limited to a system bus or a controller (not shown), may also be included in the mobile device 800. As shown in FIG. 8, a mobile operating system 816, e.g., iOS, Android, Windows Phone, etc., and one or more applications 818 may be loaded into the memory 808 from the storage 812 in order to be executed by the CPU 802. The applications 818 may include a browser or any other suitable mobile apps for receiving and rendering content streams and advertisements on the mobile device 800. User interactions with the content streams and advertisements may be achieved via the I/O devices 814, and provided to the servers 120, 135, 136 and/or other components of systems 100, 150, 200, e.g., via the network 120.

To implement various modules, units, and their functionalities described in the present disclosure, computer hardware platforms may be used as the hardware platform(s) for one or more of the elements described herein (e.g., server 120, modules 130, servers 135, 136, and/or other components of systems 100, 150, 200, described with respect to FIGS. 1-8). The hardware elements, operating systems and programming languages of such computers are conventional in nature, and it is presumed that those skilled in the art are adequately familiar therewith to adapt those technologies to infer user identity across different applications and devices, and create and update a user profile based on such inference. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 9:
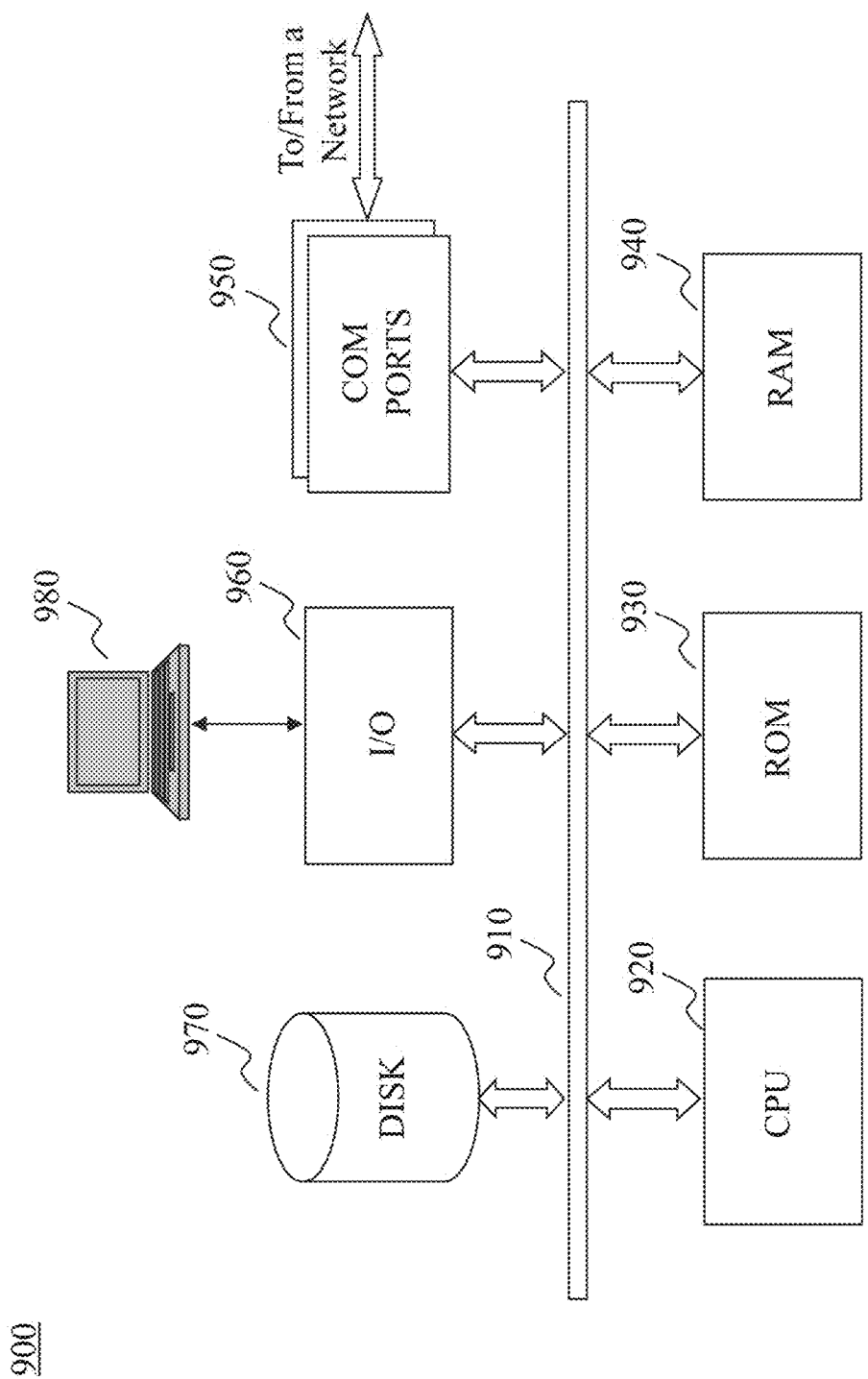
FIG. 9 depicts the architecture of a computer which can be used to implement a specialized system incorporating teachings of the present disclosure.

FIG. 9 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 900 may be used to implement any component of user profile creation and updating techniques, as described herein. For example, the user profile and app management server 120, etc., may be implemented on a computer such as computer 900, via its hardware, software program, firmware, or a combination thereof. Although only one such computer is shown, for convenience, the computer functions relating to user profile creation and updating techniques as described herein may be implemented in a distributed fashion on a number of similar platforms, to distribute the processing load.

The computer 900, for example, includes COM ports 950 connected to and from a network connected thereto to facilitate data communications. The computer 900 also includes a central processing unit (CPU) 920, in the form of one or more processors, for executing program instructions. The exemplary computer platform includes an internal communication bus 910, program storage and data storage of different forms, e.g., disk 970, read only memory (ROM) 930, or random access memory (RAM) 940, for various data files to be processed and/or communicated by the computer, as well as possibly program instructions to be executed by the CPU. The computer 900 also includes an I/O component 960, supporting input/output flows between the computer and other components therein such as user interface elements 980. The computer 900 may also receive programming and data via network communications.

Hence, aspects of the methods of enhancing ad serving and/or other processes, as outlined above, may be embodied in programming Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other user profile and app management server into the hardware platform(s) of a computing environment or other system implementing a computing environment or similar functionalities in connection with user profile creation and updating techniques. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the enhanced ad serving based on user curated native ads as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having one or more processors, a storage unit, and a communication platform capable of making a connection to a network to create and update a user profile related to a plurality of devices, the method comprising:

responsive to an execution of a first application on a first device in a first session in which a user is logged on to a cloud network via the first device, wherein a cloud-based identifier is associated with the user's session with the cloud network and a first device identifier is associated with the first device:

creating, by a profile creation and update unit, a user profile specific to the user, and storing the user profile at the storage unit, and recording, in the user profile, the first device identifier and information related to the first application, and optionally, the cloud-based identifier; and responsive to an execution of a second application on a second device in a second session in which the user is logged on to the cloud network via the second device, wherein a second device identifier is associated with the second device, and wherein the second device is different than the first device:

receiving, from the second device, via the communication platform, a query to determine whether a target user profile, including the first device identifier or the cloud-based identifier, exists, processing, by a query processing unit, the query to determine whether the target user profile exists, and responsive to a determination that the target user profile exists, adding, by the profile creation and update unit, the second device identifier and information related to the second application in the target user profile, wherein the user is logged on via a third device to another cloud network different from the cloud network, the third device having a third application installed thereon, wherein the third application and at least one of the first and second applications are configured to be logged-on into using certain app-login information, the method further comprising:

recording, by the profile creation and update unit, the app-login information specific to the user in the user profile; and responsive to an execution of the third application on the third device:

determining, by the query processing unit, whether the third application is being logged-on into using the app-login information specific to the user, and responsive to a determination that the third application is being logged-on into using the app-login information specific to the user, adding, by the profile creation and update unit, a third device identifier associated with the third device and information related to the third application in the user profile.

2. The method of claim 1, wherein the first and second applications belong to a same set of related applications.

3. The method of claim 1, further comprising:
creating by a device ID unit, or receiving from the first device, the first device identifier; and
creating by the device ID unit, or receiving from the second device, the second device identifier.

4. The method of claim 1, further comprising:
processing, by a cloud ID processing unit, the cloud-based identifier based on the first device identifier to generate a processed cloud-based identifier,
wherein responsive to the user logging on to the cloud network via the second device, the second device is configured to receive and process the processed cloud-based identifier via the cloud network, and the query is generated based on the processed cloud-based identifier, and
wherein said processing the query comprises processing the query to determine whether the target user profile including the first device identifier exists.

5. The method of claim 1, further comprising recording, by the profile creation and update unit, the cloud-based identifier in the user profile, wherein said processing the query comprises processing the query to determine whether the target user profile including the cloud-based identifier exists.

6. The method of claim 1, wherein the information related to the first application and/or the second application comprises personalized application configuration information, the method further comprising:

configuring, by an app update unit, the first application or presenting content via the first application, based on the personalized application configuration information of the second application, and/or configuring, by the app update unit, the second application or presenting content via the second application, based on the personalized application configuration information of the first application.

7. A system to create and update a user profile related to a plurality of devices, the system comprising:

a storage unit;

one or more processors configured to execute computer program instructions from a machine readable medium to:

in being responsive to an execution of a first application on a first device in a first session in which a user is logged on to a cloud network via the first device, wherein a cloud-based identifier is associated with the user's session with the cloud network and a first device identifier is associated with the first device, create a user profile specific to the user, and store the user profile at the storage unit, and record, in the user profile, the first device identifier and information related to the first application, and optionally, the cloud-based identifier; and in being responsive to an execution of a second application on a second device in a second session in which the user is logged on to the cloud network via the second device, wherein a second device identifier is associated with the second device, and wherein the second device is different than the first device, receive, from the second device, a query to determine whether a target user profile including the first device identifier or the cloud-based identifier exists, and process the query to determine whether the target user profile exists, in being responsive to a determination that the target user profile exists, add the second device identifier and information related to the second application in the target user profile, wherein the user is logged on via a third device to another cloud network different from the cloud network, the third device having a third application installed thereon, wherein the third application and at least one of the first and second applications are configured to be logged-on into using certain app-login information, in being responsive to an execution of the third application on the third device, determine whether the third application is being logged-on into using the app-login information specific to the user, record the app-login information specific to the user in the user profile, and responsive to a determination that the third application is being logged-on into using the app-login information specific to the user, add a third device identifier associated with the third device and information related to the third application in the user profile.

8. The system of claim 7, wherein the first and second applications belong to a same set of related applications.

9. The system of claim 7, wherein the one or more processors are operable to:

create the first device identifier or the second device identifier; and receive the first device identifier from the first device or the second device identifier from the second device.

10. The system of claim 7, wherein the one or more processors are operable to:

process the cloud-based identifier based on the first device identifier to generate a processed cloud-based identifier, wherein responsive to the user logging on to the cloud network via the second device, the second device is configured to receive and process the processed cloud-based identifier via the cloud network, and the query is generated based on the processed cloud-based identifier, and process the query to determine whether the target user profile including the first device identifier exists.

11. The system of claim 7, wherein the one or more processors are operable to record the cloud-based identifier in the user profile, and process the query to determine whether the target user profile including the cloud-based identifier exists.

12. The system of claim 7, wherein the information related to the first application and/or the second application comprises personalized application configuration information, wherein the one or more processors are operable to:

configure the first application or present content via the first application, based on the personalized application configuration information of the second application, and/or configure the second application or present content via the second application, based on the personalized application configuration information of the first application.

13. A machine readable, tangible, and non-transitory medium having information recorded thereon to create and update a user profile related to a plurality of devices, where the information, when read by the machine, causes the machine to perform at least the following:

responsive to an execution of a first application on a first device in a first session in which a user is logged on to a cloud network via the first device, wherein a cloud-based identifier is associated with the user's session with the cloud network and a first device identifier is associated with the first device:

creating a user profile specific to the user, and storing the user profile at the storage unit, and recording, in the user profile, the first device identifier and information related to the first application, and optionally, the cloud-based identifier; and responsive to an execution of a second application on a second device in a second session in which the user is logged on to the cloud network via the second device, wherein a second device identifier is associated with the second device, and wherein the second device is different than the first device:

receiving, from the second device, via a communication platform, a query to determine whether a target user profile including the first device identifier or the cloud-based identifier exists, processing the query to determine whether the target user profile exists, and responsive to a determination that the target user profile exists, adding the second device identifier and information related to the second application in the target user profile, wherein the user is logged on via a third device to another cloud network different from the cloud network, the third device having a third application installed thereon, wherein the third application and at least one of the first and second applications are configured to be logged-on into using certain app-login information, wherein the machine is further caused to perform the following:

recording the app-login information specific to the user in the user profile; and responsive to an execution of the third application on the third device:
- determining whether the third application is being logged-on into using the app-login information specific to the user, and
- responsive to a determination that the third application is being logged-on into using the app-login information specific to the user, adding a third device identifier associated with the third device and information related to the third application in the user profile.

14. The medium of claim 13, wherein the machine is further caused to perform the following:

processing the cloud-based identifier based on the first device identifier to generate a processed cloud-based identifier, wherein responsive to the user logging on to the cloud network via the second device, the second device is configured to receive and process the processed cloud-based identifier via the cloud network, and the query is generated based on the processed cloud-based identifier, and wherein said processing the query comprises processing the query to determine whether the target user profile including the first device identifier exists; and recording the cloud-based identifier in the user profile, wherein said processing the query comprises processing the query to determine whether the target user profile including the cloud-based identifier exists.

15. The medium of claim 13, wherein the information related to the first application and/or the second application comprises personalized application configuration information, wherein the machine is further caused to perform the following:

configuring the first application or presenting content via the first application, based on the personalized application configuration information of the second application, and/or configuring the second application or presenting content via the second application, based on the personalized application configuration information of the first application.

16. A method, implemented on a machine having one or more processors, a storage unit, and a communication platform capable of making a connection to a network to synchronize applications sessions on different devices, the method comprising:

receiving, from a first device via the communication platform, a first device ID associated with the first device of a user and information about a first session of a first application executed on the first device, the user being logged on to a cloud network via the first device, wherein a cloud-based identifier is associated with the user's session with the cloud network;

creating, by a profile creation and update unit, a user profile based on the first device ID and the information about the first application, and optionally, on the cloud-based identifier;

receiving, from a second device different than the first device, via the communication platform, a second device ID associated with the second device of the user and information about a second session of a second application executed on the second device, the user being logged on to the cloud network via the second device;

responsive to a query that leads to a determination that the user profile, including the first device ID or the cloud-based identifier, exists, updating, by the profile creation and update unit, the user profile based on the second device ID and the information about the second application; and applying, by an app update unit, the information about the first application to the execution of the second application on the second device, wherein the first and second applications are related, wherein the user is logged on via a third device to another cloud network different from the cloud network, the third device having a third application installed thereon, wherein the third application and at least one of the first and second applications are configured to be logged-on into using certain app-login information, the method further comprising:

recording, by the profile creation and update unit, the app-login information specific to the user in the user profile; and responsive to an execution of the third application on the third device and a determination that the third application is being logged-on into using the app-login information specific to the user, adding, by the profile creation and update unit, a third device ID associated with the third device and information related to the third application in the user profile.

17. The method of claim 16, further comprising:

applying, by the app update unit, the information about the second application to the execution of the first application on the first device, wherein the information about the first application and the information about the second application include user preferences related to application content, user interface and ads presented through the first and second applications, respectively.

* * * * *